Figure 1:
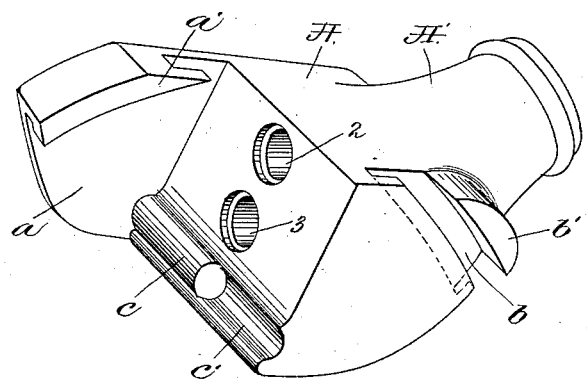

(No Model.)

J. H. SEWALL.
HOSE COUPLING.

No. 363,553. Patented May 24, 1887.

Witnesses
Fred L. Emery
John F. C. Prescott

Inventor.
James H. Sewall.
by Crosby & Gregory
attys.

UNITED STATES PATENT OFFICE.

JAMES H. SEWALL, OF PORTLAND, MAINE, ASSIGNOR TO THE SEWALL SAFETY CAR HEATING COMPANY, OF SAME PLACE.

HOSE-COUPLING.

SPECIFICATION forming part of Letters Patent No. 363,553, dated May 24, 1887.

Application filed October 19, 1886. Serial No. 216,615. (No model.)

*To all whom it may concern:*

Be it known that I, JAMES H. SEWALL, of Portland, county of Cumberland, and State of Maine, have invented an Improvement in Hose-Couplings, of which the following description, in connection with the accompanying drawings, is a specification, like letters on the drawings representing like parts.

This invention has for its object to construct a two-part hose-coupling, each half of which is alike, which may be used to couple together hose for the passage of steam, air, water, gas, &c.

The coupling herein to be described hangs by gravity and is provided with locking devices which keep the two halves locked together in all positions except when turned upward at the center. Each half is composed, preferably, of a single piece of metal having an upwardly-pointing neck or end, which is attached to the pipe or hose to be coupled, the body portion and neck having a passage through it to permit free and unobstructed passage for steam, air, water, or any other fluid.

The body portion of each half of the coupling has at one side opposite to each other a broad flat extension having an inturned lip or flange at one edge, and the opposite side of each half is cut away to present a groove or passage, with which the inturned flange of the broad extension co-operates.

At the lower end of the meeting face of each half of the coupler a rib is provided, extending half the width of said meeting face, and for the remaining distance the face is cut away to present a recess, which receives the rib of the companion half, to thus form, in a measure, a hinge joint, upon which the two faces of the coupler are turned to disengage them from each other.

Figure 2:
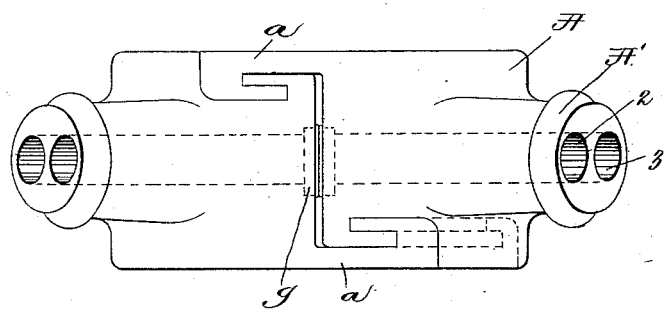

Figure 1 shows in perspective one half of a hose-coupling embodying this invention, it being understood that the other half is shaped like it, and Fig. 2 a top view of the two parts of the coupling locked together.

The two faces of the coupling being alike, a detail description of only one need be made. Each half consists of a body portion, A, having an upwardly-turned neck or extension, A', both of which are bored centrally, as at 2 3, to form, with the hose to be coupled, a continuous passage, the two passages herein shown being intended, respectively, for steam and air; yet it is obvious that one passage alone may be employed.

The body portion A is provided at one side with a broad flat extension, *a*, projecting forward to overlap one side of the body portion of the companion half, and said extension *a* has at one edge an overturned lip or flange, *a'*.

At that side of each half of the coupling opposite the broad extension *a* a groove or passage, *b*, is cut, of suitable shape to receive the flange *a'*, and a shoulder, *b'*, is also provided, which serves as a bearing.

The meeting face of the body portion A is provided at its lower side with a rib, *c*, extending about one-half of the width of the coupling, and said face is cut away at the side of the rib *c*, to present a deep groove or recess, *c'*, for the remaining distance, this recess or groove receiving the rib *c* of the companion portion.

The two parts of the coupling being placed opposite to each other, as shown in Fig. 2, it will be seen that the extension *a* of one half overlaps the opposite side of the other half, the flange *a'* entering the groove *b* and the rib *c* entering a recess formed in the opposite half corresponding with the recess *c'*, while the rib formed upon said opposite half enters the recess *c'*. It will thus be seen that the two halves are firmly locked together, and capable of being disengaged only by moving them upward on the ribs *c c*, turning in the grooves *c' c'*, which serve as a hinge joint or connection.

The hose to be coupled is attached to the neck A', and the coupling locked together hangs by gravity. The extension A and its flange A' entering the groove *b'* abut the halves together, preventing any disengagement thereof by downward or lateral movement, but permitting the said halves to be disengaged by turning them upward on the hinge-joint, as above described. They will thus become disengaged themselves when the cars on which they are situated become uncoupled.

To insure a steam or air tight joint at the meeting faces of the portions of the coupling, a suitable rubber or other packing, g, (see dotted lines, Fig. 2,) is introduced.

Should the cars be uncoupled by accident, or otherwise, and the hose remain coupled, as the said cars separate the two halves of the coupling will immediately separate, so that no injury can be done.

I am aware that two-part hose couplings have been made, each part of which has a passage through it; but a valve has been employed at the junction of the two passages to close the passage when the two parts of the coupling are disengaged, and such a coupling, having indirect and obstructed passages, I do not herein claim.

I claim—

1. A two-part hose coupling composed of like halves or portions, each half consisting of a body portion, A, having a suitable passage therethrough, a broad extension, a, locking-flange a', shaped as described, and located at one side of the body portion, a groove or passage, b, shaped as described, upon the other side of the body portion, and a joint connection at the lower side of the meeting face of the body portion A, upon which the two halves may be turned to disengage them one from the other, substantially as described.

2. A hose-coupling consisting of two like parts, each of which has a body portion, A, with an upturned end and a broad extension, a, located at one side of the said body portion, and provided with an overhanging flange, a', at its upper part, the said body portion having in its side opposite the said extension a groove, b, of the same form as the said flange, and the face of the body A having at its lower side a bearing portion to form a joint, whereby when the two parts of the coupling are together and are suspended by their ends they are locked against lateral displacement and their abutting faces are held together by gravity, but are adapted to be separated by a longitudinal strain, which moves the central portion of the coupling upward, substantially as set forth.

3. A two-part hose-coupling composed of two like halves with abutting faces, suitable passages, and upturned outer ends, the two parts of the coupling having at the lower portions of the said faces a joint-connection, and each of the said halves having on one side an extension provided with an overhanging locking-flange, and in its opposite side an undercut groove corresponding in form to the said flange, whereby when the coupling hangs by gravity the abutting faces will be pressed together and lateral displacement prevented, but when a lengthwise strain is applied the coupling will be separated, substantially as set forth.

In testimony whereof I have signed my name to this specification in the presence of two subscribing witnesses.

JAMES H. SEWALL.

Witnesses:
DANIEL D. SEWALL,
C. B. STROUT.